(12) United States Patent
Whitehill et al.

(10) Patent No.: US 7,756,041 B2
(45) Date of Patent: Jul. 13, 2010

(54) EMBEDDED ROUTING ALGORITHMS UNDER THE INTERNET PROTOCOL ROUTING LAYER OF A SOFTWARE ARCHITECTURE PROTOCOL STACK IN A MOBILE AD-HOC NETWORK

(75) Inventors: Eric Whitehill, Ft. Wayne, IN (US); Eric White, Cedarburg, WI (US)

(73) Assignee: MeshNetworks, Inc., Maitland, FL (US)

( * ) Notice: Subject to any disclaimer, the term of this patent is extended or adjusted under 35 U.S.C. 154(b) by 1784 days.

(21) Appl. No.: 10/157,979

(22) Filed: May 31, 2002

(65) Prior Publication Data
US 2002/0191573 A1  Dec. 19, 2002

Related U.S. Application Data

(60) Provisional application No. 60/297,769, filed on Jun. 14, 2001.

(51) Int. Cl.
*H04L 12/28* (2006.01)
*H04W 72/00* (2009.01)

(52) U.S. Cl. ............... 370/238; 370/329; 370/400; 455/452.2

(58) Field of Classification Search .......... 370/310, 370/328, 338, 351, 389, 400, 401, 406, 216, 370/217, 221, 225, 229–232, 235, 237, 236, 370/252, 238, 253, 329, 332, 464–469; 455/445, 455/422.1, 452.21, 452
See application file for complete search history.

(56) References Cited

U.S. PATENT DOCUMENTS

| | | | |
|---|---|---|---|
| 4,494,192 A | 1/1985 | Lew et al. | 364/200 |
| 4,617,656 A | 10/1986 | Kobayashi et al. | 370/74 |
| 4,736,371 A | 4/1988 | Tejima et al. | 370/95 |
| 4,742,357 A | 5/1988 | Rackley | 342/457 |

(Continued)

FOREIGN PATENT DOCUMENTS

CA  2132180  3/1996

(Continued)

OTHER PUBLICATIONS

Hannan Xiao; Seah, W.K.G.; Lo, A.; Chua, K.C., "A flexible quality of service model for mobile ad-hoc networks,"Vehicular Technology Conference Proceedings, 2000. VTC 2000-Spring Tokyo. 2000 IEEE 51st , vol. 1, no.pp. 445-449 vol. 1, 2000.*

(Continued)

*Primary Examiner*—Aung S Moe
*Assistant Examiner*—Kerri M Rose
(74) *Attorney, Agent, or Firm*—Randi L. Karpinia; Joseph J. Bucczynski

(57) ABSTRACT

A novel software architecture protocol stack with embedded routing algorithms under the Internet Protocol (IP) routing layer in order to provide high quality distribution of multimedia (voice, video, and data) services. These routing algorithms may include Logical Link Control, Adaptive Transmission Protocol, Neighbor Discovery, Traffic Control, Ad-Hoc Routing, Flow Processing, Intelligent Access and Admission Control. These routing algorithms when implemented further provide for advantages in speed of service, reliability of service, self-healing in case of catastrophic failure of an infrastructure component, load-balancing and geographic reuse.

14 Claims, 7 Drawing Sheets

U.S. PATENT DOCUMENTS

| | | | |
|---|---|---|---|
| 4,747,130 A | 5/1988 | Ho | 379/269 |
| 4,910,521 A | 3/1990 | Mellon | 342/45 |
| 5,034,961 A | 7/1991 | Adams | 375/130 |
| 5,068,916 A | 11/1991 | Harrison et al. | 455/39 |
| 5,231,634 A | 7/1993 | Giles et al. | 370/95.1 |
| 5,233,604 A | 8/1993 | Ahmadi et al. | 370/60 |
| 5,241,542 A | 8/1993 | Natarajan et al. | 370/95.3 |
| 5,317,566 A | 5/1994 | Joshi | 370/60 |
| 5,392,450 A | 2/1995 | Nossen | 455/12.1 |
| 5,412,654 A | 5/1995 | Perkins | 370/94.1 |
| 5,424,747 A | 6/1995 | Chazelas | 342/70 |
| 5,502,722 A | 3/1996 | Fulghum | 370/69.1 |
| 5,517,491 A | 5/1996 | Nanni et al. | 370/29 |
| 5,555,425 A | 9/1996 | Zeller et al. | 395/800 |
| 5,555,540 A | 9/1996 | Radke | 370/16.1 |
| 5,572,528 A | 11/1996 | Shuen | 370/85.13 |
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | 370/79 |
| 5,623,495 A | 4/1997 | Eng et al. | 370/397 |
| 5,627,976 A | 5/1997 | McFarland et al. | 395/308 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,706,428 A | 1/1998 | Boer et al. | 395/200 |
| 5,717,689 A | 2/1998 | Ayanoglu | 370/349 |
| 5,745,483 A | 4/1998 | Nakagawa et al. | 370/335 |
| 5,768,527 A * | 6/1998 | Zhu et al. | 370/231 |
| 5,774,876 A | 6/1998 | Wooley et al. | 705/28 |
| 5,781,540 A | 7/1998 | Malcolm et al. | 370/321 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagarajet al. | 395/306 |
| 5,805,977 A | 9/1998 | Hill et al. | 455/31.3 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 395/297 |
| 5,857,084 A | 1/1999 | Klein | 395/309 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,963,559 A | 10/1999 | Ohki | |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/126 |
| 6,064,626 A | 5/2000 | Stevens | 365/233 |
| 6,067,291 A | 5/2000 | Kamerman et al. | 370/338 |
| 6,078,566 A | 6/2000 | Kikinis | 370/286 |
| 6,097,703 A * | 8/2000 | Larsen et al. | 370/254 |
| 6,104,712 A | 8/2000 | Robert et al. | 370/389 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,132,306 A | 10/2000 | Trompower | 453/11.1 |
| 6,147,975 A | 11/2000 | Bowman-Amuah | 370/252 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | Van Bokhorst et al. | 455/343 |
| 6,208,870 B1 | 3/2001 | Lorello et al. | 455/466 |
| 6,223,240 B1 | 4/2001 | Odenwald et al. | 710/129 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | |
| 6,327,300 B1 | 12/2001 | Souissi et al. | 375/219 |
| 6,338,087 B1 | 1/2002 | Okanoue | |
| 6,349,091 B1 | 2/2002 | Li | 370/238 |
| 6,349,210 B1 | 2/2002 | Li | 455/450 |
| 6,370,375 B1 | 4/2002 | Shively | |
| 6,640,248 B1 * | 10/2003 | Jorgensen | 709/226 |
| 6,735,448 B1 * | 5/2004 | Krishnamurthy et al. | 455/522 |
| 6,788,670 B1 * | 9/2004 | Larsson | 370/351 |
| 6,873,839 B2 * | 3/2005 | Stanforth | 455/343.2 |
| 7,035,285 B2 * | 4/2006 | Holloway et al. | 370/474 |
| 2001/0003191 A1* | 6/2001 | Kovacs et al. | 709/226 |
| 2001/0022000 A1* | 9/2001 | Horn et al. | 725/95 |
| 2001/0053699 A1 | 12/2001 | McCrady et al. | 455/513 |
| 2002/0061009 A1* | 5/2002 | Sorensen | 370/351 |
| 2002/0062388 A1* | 5/2002 | Ogier et al. | 709/238 |
| 2002/0145978 A1* | 10/2002 | Batsell et al. | 370/238 |
| 2003/0165117 A1* | 9/2003 | Garcia-Luna-Aceves et al. | 370/238 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| EP | 1035745 A1 | 9/2000 |
| FR | 2683326 | 7/1993 |
| JP | H10-23059 | 1/1998 |
| JP | H11-289335 | 10/1999 |
| JP | 2001-136199 | 5/2001 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | 0039967 | 7/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Papavassiliou, S.; Tekinay, S.; Malick, K.; Walker, K., "Performance evaluation framework and quality of service issues for mobile ad hoc networks in the MOSAIC ATD," MILCOM 2000. 21st Century Military Communications Conference Proceedings, vol. 1, no.pp. 297-303 vol. 1, 2000.*

Broch, J., Maltz, D. A., Johnson, D. B., Hu, Y., and Jetcheva, J. 1998. A performance comparison of multi-hop wireless ad hoc network routing protocols. In Proceedings of the 4th Annual ACM/IEEE international Conference on Mobile Computing and Networking (Dallas, Texas, United States, Oct. 25-30, 1998).*

Garg, Vijay K., IS-95 CDMA and cdma2000, Prentice Hall PTR, Upper Saddle River, NJ, 2000, pp. 330-332.*

RFC 2461, Dec. 1998, pp. 17-26.*

Wong et al., "Soft Handoffs in CDMA Mobile Systems", Dec. 1997, IEEE Personal Communications.

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1999, $2^{nd}$ Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the $4^{th}$ Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Self-Healing Wireless Networks", 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throuput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

Clausen et al., "Optimized Link State Routing Protocol".

Perkins et al., "Ad Hoc On-Demand Distance Vector (ADOV) Routing".

Johnson et al., The Dynamic Source Routing Protocol For Mobile Ad Hoc Networks (DSR).

Japan Office Action (translated) - Nov. 4, 2007, 4 pages.

India Office Action, First Examination Report - Jul. 30, 2008, 2 pages.

Japan Office Action (translated) - May 7, 2008, 4 pages.

Korea Office Action (translated) - Aug. 25, 2008, 2 pages.

Korea Office Action (translated) - Jan. 29, 2009, 1 page.

Japan Office Action (translated) - Mar. 17, 2009, 4 pages, Apr. 13, 2010.

India Office Action - Jul. 23, 2009, 2 pages.

EPC Office Action - October 8, 2009, 6 pages.

Chandran K. et al, A Feedback Based Scheme for Improving TCP Performance in Ad-hoc Wireless Networks, Distributed Computing Systems. Proceedings, 18th International Conference on Amsterdam, Netherlands. IEEE Comput. Soc, US May 26, 1998, pp. 472-479.

Maltz, David A. et al, Lessons from a Full-Scale Multi-Hop Wireless Ad Hoc Network Testbed, IEEE Communications Society, IEEE Personal Communications, vol. 8, No. 1, Feb. 1, 2001, pp. 8-15.

* cited by examiner

EMBEDDED ROUTING ALGORITHMS UNDER THE INTERNET PROTOCOL ROUTING LAYER OF A SOFTWARE ARCHITECTURE PROTOCOL STACK IN A MOBILE AD-HOC NETWORK

This application claims benefit under 35 U.S.C. §119(e) from U.S. provisional patent application Ser. No. 60/297,769, filed on Jun. 14, 2001, the entire contents being incorporated herein by reference.

BACKGROUND OF THE INVENTION

1. Field of the Invention

The present invention relates to a software architecture protocol stack for use in an ad-hoc wireless communication network. More particularly, the present invention relates to a protocol stack having embedded routing algorithms under the Internet Protocol (IP) routing layer, to thus provide high quality distribution of multimedia (voice, video, and data) services in a mobile wireless ad-hoc communications network.

2. Description of the Related Art

Many different types of wireless communication networks currently exists, such as wireless cellular telephone networks and the like. These types of wireless networks generally employ significant infrastructure, such as base stations, gateways, and so on, that communicate directly with wireless access devices that provide access to services such as the Internet, public switched telephone network (PSTN), and other cellular networks, to name a few. Examples of these types of networks are the current cellular communications networks, such as AMPS, TACS, NMT, GSM, IS-136 and IS-95.

In addition, certain cellular companies have developed networks called Wireless Access Protocol (WAP) networks that are capable of offering data services rather than only voice services. Furthermore, researchers have begun examining the application of ad-hoc networks for the delivery of multimedia content over wireless media. For example, in the Mobile Ad-Hoc Networking Group (MANET) of the Internet Engineering Task Force (IETF), researchers are applying the principles of ad-hoc routing on top of the Internet Protocol (IP), as described in a document by Johnson et al. entitled "The Dynamic Source Routing Protocol for Mobile Ad Hoc Networks", in a document by Jacquet et al. entitled "Optimized Link Sate Routing Protocol", and in a document by Perkins et al. entitled "Ad Hoc On-Demand Distance Vector (AODV) Routing", the entire contents of each of these documents being incorporated herein by reference.

FIG. 1 is a conceptual diagram illustrating an example of a protocol stack 10 for a typical IETF-MANET Mobile Ad-Hoc Networking Group. The protocol stack 10 is implemented as a five-layer software stack, referenced from the bottom layer to the top. The lowest layer, the Physical Layer 12, includes the RF and modem circuits involved in generating channel quality information, such as a direct sequence spread spectrum (DSSS) modem with a 2.4 GHz radio frequency (RF) typically associated with code division multiple access (CDMA) systems. The Physical Layer 12 is responsible for transmitting and receiving configuration and application data with the Network Layer or Media Access Control (MAC) layer 14.

In a typical MANET protocol stack, the MAC layer 14 is specified in the IEEE 802.11 standard for wireless local area networks (LANs) and utilizes a Carrier Sense Multiple Access with Collision Avoidance (CSMA/CA) protocol. As can be appreciated by one skilled in the art, the CSMA/CA protocol may involve initial handshakes of a Request-to-Send (RTS) message followed by a Clear-to-Send (CTS) or Not-Clear-to-Send (NCTS) message exchanged between a source node and a destination node prior to sending the multimedia (voice, video, data) message. Afterward, an Acknowledgement (ACK) message or Non-Acknowledgement (NACK) message may be sent from the destination node to the source node to indicate reception of the transmitted message. Layered above the MAC layer 14 is the routing internet protocol (IP) layer 16, which includes other Internet protocols schemes, such as Internet control message and Internet group management protocol.

In communication with the IP layer 16 is the transport layer 18 that defines the method of communicating. Well-known examples of the transport layer are TCP and UDP protocols. The uppermost layer, which is the application layer 20, provides application protocols, such as dynamic source routing (DSR) or ad-hoc on-demand distance vector routing (AODV) 20a, resource reservation protocol (RSVP) 20b, real time transport protocol (RTP) 20c, simple network management protocol (SNMP) 20d, dynamic host configuration protocol (DHCP) 20e, and authentication authorization and accounting protocol (AAA) 20f.

Although the protocol stack 10 shown in FIG. 1 may be suitable for enabling a network to provide multimedia services, such as voice, video and data services, this type of protocol arrangement can be somewhat complex and time-consuming in terms of message delivery time and reliability. Therefore, this protocol stack arrangement has limited capability for commercial applications. Accordingly, a need exists for an improved protocol stack configuration which enables a wireless ad-hoc communication network to deliver multimedia content with sufficient speed and reliability suitable for use in commercial communication networks.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 2:
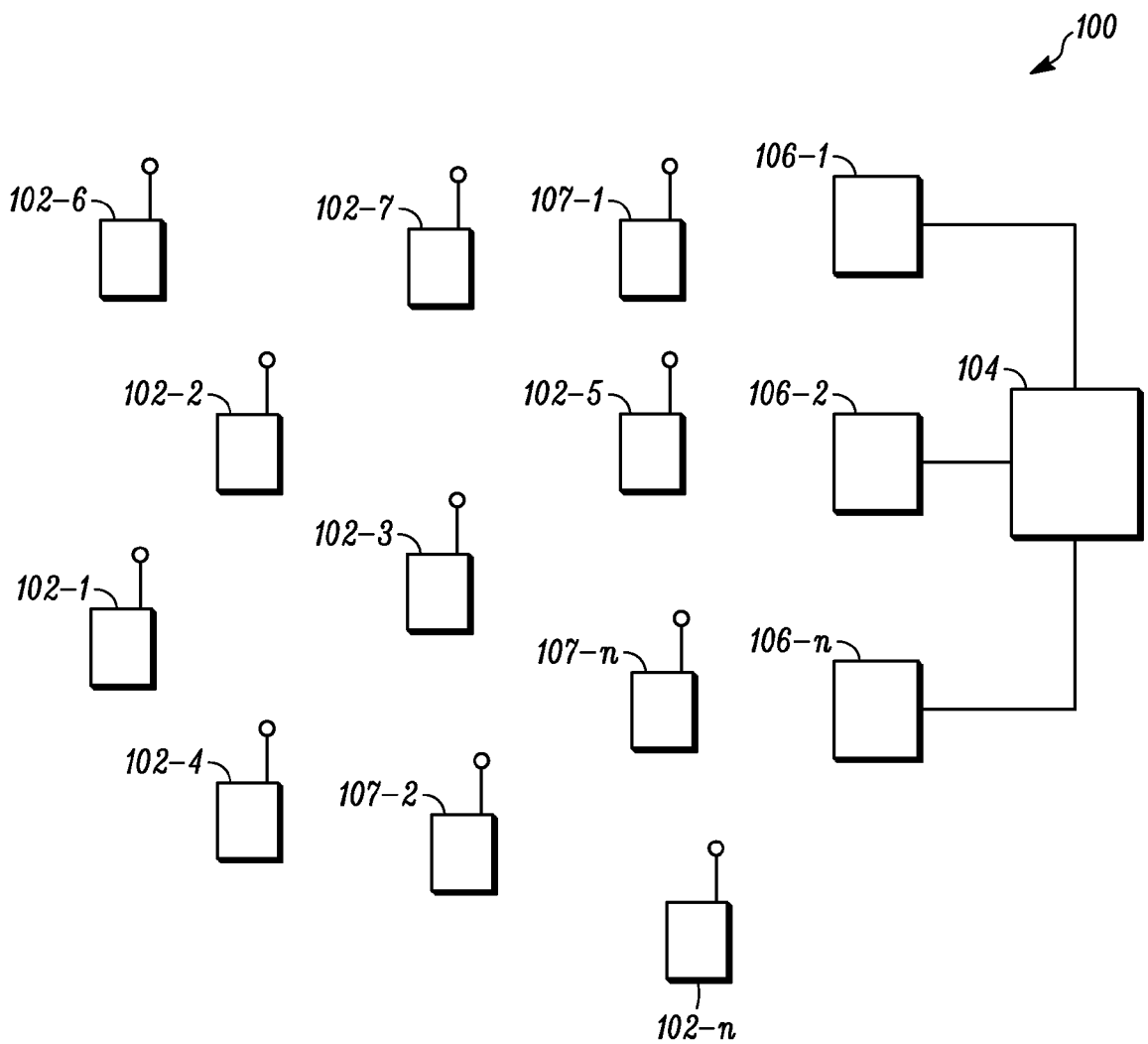
FIG. 2 is a block diagram of an example of an ad-hoc wireless communications network employing a protocol stack in accordance with an embodiment of the present invention.

FIG. 2 is a conceptual block diagram illustrating an example of a wireless communications network 100 employing an embodiment of the present invention. Specifically, the network 100 can be an ad-hoc packet switched network, which includes a plurality of mobile nodes 102-1 through 102-n (referred to generally as nodes 102 or mobile nodes 102), and a fixed network 104 having a plurality of fixed nodes or access points 106-1, 106-2, . . . , 106-n (referred to generally as nodes 106 or fixed nodes 106), for providing the mobile nodes 102 with access to the fixed network 104. A node 102 can be a wireless telephone, radio, user terminal or any other suitable mobile wireless device. The fixed network 104 includes, for example, a core local access network (LAN), and a plurality of servers and gateway routers, to thus provide the mobile nodes 102 with access to other networks, such as the public switched telephone network (PSTN) and the Internet. The network further includes a plurality of wireless routers 107-1, 107-2 through 107-n (referred to generally as nodes 107) which are capable of routing data packets to other nodes 102, 106 or 107.

Figure 3:
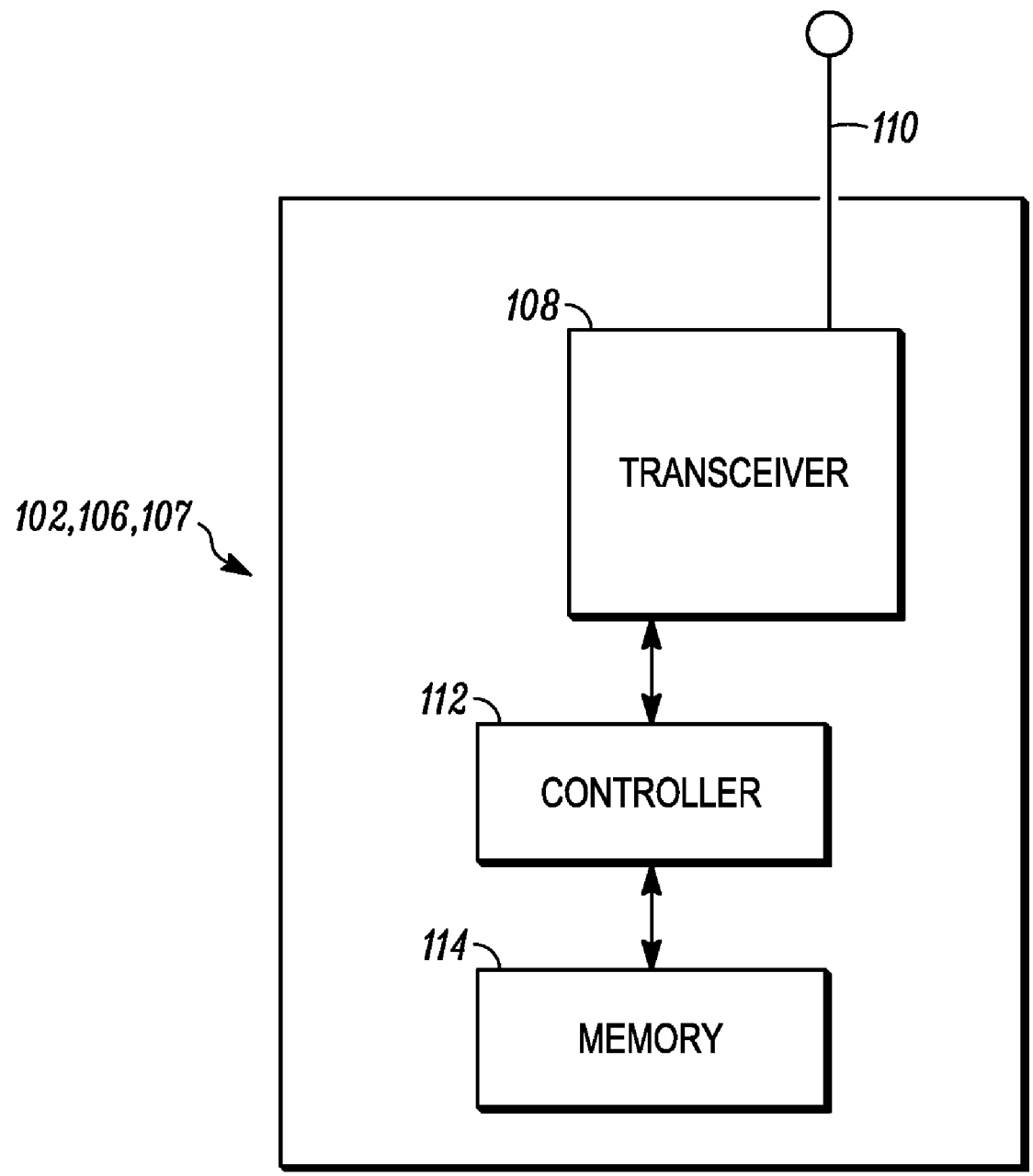
FIG. 3 is a block diagram of an example of a wireless node as shown in FIG. 2.

As shown in FIG. 3, each mobile node 102, fixed node 106 or wireless router 107 includes a modem which is essentially a transceiver 108 including a transmitter and a receiver, which collectively can be referred to as a modem, and which are coupled to an antenna 110 and capable of respectively transmitting and receiving signals, such as packetized data signals, under the control of a controller 112. The packetized data signals can include, for example, voice, data or multimedia. Each node 102, 106, 107 further includes a memory 114, which can include a read only memory (ROM) for storing information pertaining to the operation of the node 102, 106, 107 and a random access memory (RAM) for storing information such as routing table information and the like in accordance with which data packets are transmitted, received and routed by the transceiver 108.

Each mobile node 102, fixed node 106 and wireless router 107 can communicate over plural data channels, as well as a reservation channel, using CSMA/CA techniques. An example of a network employing CSMA/CA techniques is described in U.S. patent application Ser. No. 09/705,588, the entire contents of which is incorporated herein by reference. In this type of network, a plurality of nodes communicate with each other using plural, shared parallel data channels and a separate reservation channel. As used herein, the term node refers to a communication device operating in a network of communication devices. The node may be a mobile communication device, such as a radio or wireless telephone, or the node may be stationary or fixed in a particular location. Also, as used herein, the term channel refers to a communication path between nodes, and different channels can exist on separate communication media or on a common communication medium, with individual channels being separated by any suitable means, such as time, frequency, or encoding.

Figure 4:
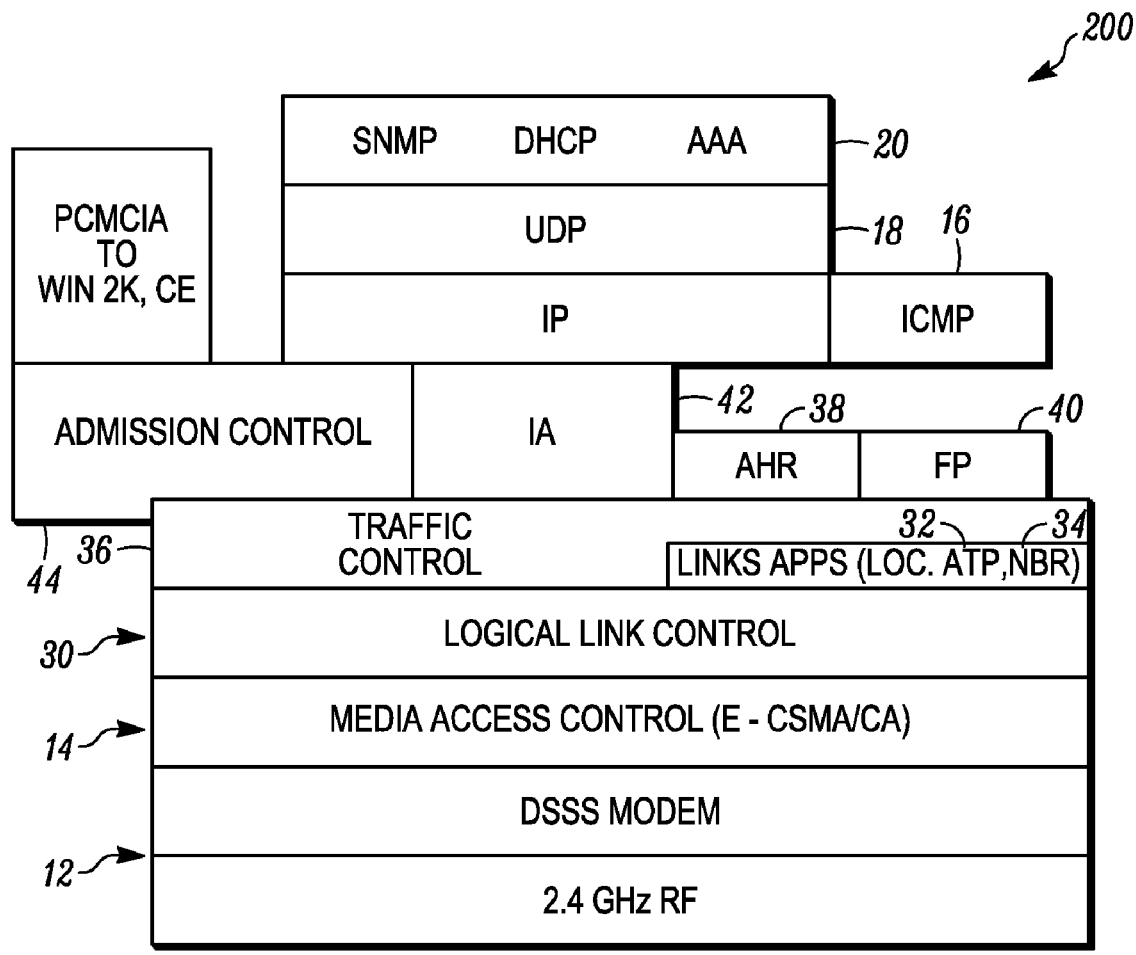
FIG. 4 is a conceptual diagram illustrating an example of a protocol stack in accordance with an embodiment of the present invention, which is adapted for use in a wireless ad-hoc communication network as shown in FIG. 2.

FIG. 4 is a conceptual diagram of a protocol stack 200 in accordance with an embodiment of the present invention, that is employed in the ad-hoc communication network 100 shown in FIG. 2. It is noted that numerals identified in this figure which are identical with those identified in the protocol stack 10 shown in FIG. 1 are intended to represent components identical or similar to those shown in FIG. 1.

As shown in FIG. 4, the protocol stack 200 includes the following protocols: Logical Link Control (LLC) 30, Adaptive Transmission Protocol (ATP) 32, Neighbor Discovery (NBR) 34, Traffic Control (TC) 36, Ad-Hoc Routing (AHR) 38, Flow Processing (FP) 40, Intelligent Access (IA) 42, and Admission Control (AC) 44. The protocol stack 200 also includes the layers 12, 14, 16, 18 and 20 present in the stack 10 shown in FIG. 1. As described in more detail below, the protocol stack 200 embeds these protocols and routing algorithms underneath the IP layer 16. The various combinations of these protocol algorithms provide advantages among speed of service, reliability of service, self-healing in case of catastrophic failure of an infrastructure component, load-balancing and geographic reuse when applied to the wireless multimedia delivery of services/messages. These embedded routing algorithms provide high quality distribution of multimedia (voice, video, data) services over mobile multimedia networks that are supported by a significant infrastructure. The infrastructure provides access to services such as the Internet, public switched telephone network (PSTN), and other cellular networks. The embedded routing also enhances the delivery of real time multimedia services over a wide area wireless network where speed and quality of service (QoS) determine the commercial interest in the product offering.

Figure 1:
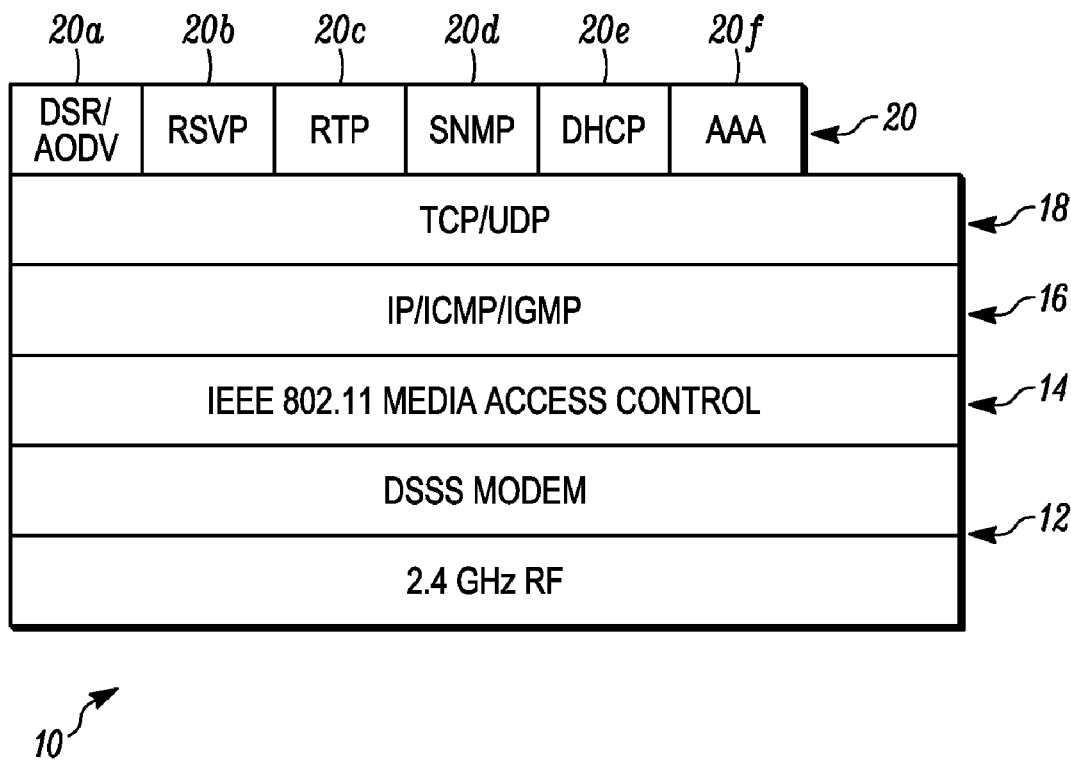
FIG. 1 is a conceptual diagram illustrating an example of a protocol stack for a typical IETF-MANET Mobile Ad-Hoc Networking Group.

As in the protocol stack 10 shown in FIG. 1, the lowest layer in protocol stack 200 is the Physical Layer 12 which, as described above, includes the RF and modem circuits involved in generating channel quality information, such as a direct sequence spread spectrum (DSSS) modem with a 2.4 GHz radio frequency (RF) typically associated with code division multiple access (CDMA) systems. The Physical Layer 12 is responsible for transmitting and receiving configuration and application data with the Network Layer or Media Access Control (MAC) layer 14. As stated, further details of these layers 12 and 14 are described above and will not be further described here.

The next layer in the protocol stack 200 is the Logical Link Control (LLC) layer. The LLC 30 in accordance with an embodiment of the present invention comprises link layer queues, random backoff algorithm, relevancy timers, and retransmission policy which are described in more detail below. These elements combine to insure the reliable and timely delivery of packets across the DSSS modem. The queuing and backoff strategies are Quality of Service (QoS) aware. Specifically, voice packets are transmitted with short backoff timers operating according to a linear algorithm such that the retransmission attempts are accomplished before the voice segments become irrelevant.

The relevancy timers for voice are set such that the voice segments are successfully transmitted within the jitter buffer expectations of the applications, or they are removed from the queues in favor of transmitting successive voice segments which are relevant to the current playback of the VoIP application. The backoff algorithm for datagrams is based on an exponential algorithm that attempts to reduce congestion by slowing the introduction of data segment onto the channel. The relevancy timers for datagrams are set in accordance with the TCP retransmission timers such that a TCP retry only occurs when it is necessary. Effectively, TCP intervenes whenever the datagram has not been received and all link layer attempts have been attempted without success. A final capability of the LLC 30 algorithm is concatenation of messages to common destinations. This concatenation improves the efficiency of message transfer by using one channel access attempt to transfer up to ten messages. The LLC 30 queues a small number of packets greater than one to support concatenation as well as the ability to send packets to nodes that are currently free when the packet at the front of the queue is addressed to a node that is currently busy.

The queues, random backoff algorithm, relevancy timers, and retransmission policy of the LLC layer 30 will now be described in more detail.

Queues—The link layer queuing algorithm is a prioritized First-In-First-Out (FIFO) algorithm. The priority scheme for this queue is dependent on the Quality-of-Service (QoS) requested and, secondarily, on the number of transmission attempts already accomplished. The QoS is based on the IP TOS field in the IPv4 or IPv6 header. Within this field, the precedence values are used to order the packets in the LLC queue. Within a precedence value, packets are ordered according to the number of transmission attempts where those packets which have been attempted are sent prior to those which are new arrivals to the queue. This promotes the correct ordering of the packets which is beneficial to some applications, such as Microsoft NetMeeting. If the IP TOS field has not been set appropriately, the network 100 determines the type of application which generated the datagram. Datagrams are identified as Network Control, Voice, Streaming Media, and Data at a minimum.

Random Backoff—The random backoff algorithm is dependent on the QoS requested. Within the network 100, datagrams are marked according to their application if the IP TOS field has not been set appropriate. Datagrams that are marked as Voice or Streaming Media employ a linear random backoff algorithm according to the following equation:

RandomBackoff=MIN_BACKOFF+
random(REAL_TIME_BACKOFF_INTERVAL)

The MIN_BACKOFF value is currently set to 5 milliseconds. The value of REAL_TIME_BACKOFF_INTERVAL is currently set to 10 milliseconds. This creates a uniformly distributed random interval between 5 and 15 milliseconds. The linear backoff algorithm insures that time sensitive datagrams (Voice, Streaming Media) are not subjected to the congestion control function which is inherent in exponential backoff algorithms. That is, time sensitive datagrams should be delivered quickly or not delivered at all. Time sensitive datagrams which arrive late to the destination application are destroyed without entering the video or audio codec's, and thus, they are better off not transmitted.

Non-real time datagrams are employ an exponential backoff algorithm according to the following equation:

Random Backoff=20+Random(100)*
$2^{(Number\ of\ failed\ attempts)}$ms

The exponential term in the random backoff algorithm progressively increases the amount of time a datagram is held from the channel. This mechanism responds to perceived congestion on the reservation channel by slowing down this nodes contribution to the problem. Datagrams undergoing longer random backoff intervals have additional time to learn about the current channel conditions and take appropriate action to improve their probability of successful delivery.

Relevancy Timers—The link layer queuing algorithm has been augmented with a relevancy timer for datagrams to reduce the amount of bandwidth that is wasted due to exceeding its lifetime. Datagrams which have exceeded their relevancy timer are discarded and the traffic control module is notified so that additional datagrams can be considered for transmission by the logical link control module. The relevancy timers are set to the following exemplary values depending on their datagram type, although any suitable values can be chosen:

Voice=50 ms

Streaming Media=100 ms

Data=1 second

The Voice and Streaming Media timers are associated with delivering an audio stream which meets the recommendations of the ITU. The data timer is set to 1 second to interoperate with the TCP protocol. TCP has a timeout mechanism for segment retransmissions when acknowledgements are not received in the proper time. The protocol stack seeks to minimize the duplicate delivery of TCP segments caused by data arriving late due to a transient condition on congestion.

Retransmission policy—The number of transmission attempts are dependent on the data type being forwarded. Voice and Streaming Media are limited to four channel access attempts due to their relevancy. Datagrams are permitted up to six channel access attempts to improve link layer reliability and minimize TCP retransmissions.

As shown in FIG. 4, the next layer in the protocol stack 200, which is identified as the Link Apps layer, includes the Adaptive Transmission Protocol (ATP). The ATP 32 algorithm shown is integrated with the backoff strategy in the LLC and the signal quality extracted from the DSSS Modem. The ATP 32 algorithm optimally chooses the next data rate (currently adjustable between 500 Kbps and 8 Mbps) and the next power level (currently adjustable between −10 Dbm and +30 Dbm). This algorithm attempts to adjust the transmission parameters such that the maximum data rate is used to avoid congestion subject to maintaining a high probability that the message transfer will succeed.

In the discussion that follows, the source node (e.g., node 102, 106 or 107 in FIG. 3) is defined to be the source of the transmission, not necessarily the source of the packet. Similarly, the destination node (e.g., node 102, 106 or 1070 is defined to be the destination for the transmission, not necessarily the final destination for the packet. The destination node is assumed to be within communication range of the source node. The transmission parameters include the information rate and transmitter power level to be used for a transmission. The ATP utilizes measurements made in the destination node's receiver to optimize the transmission parameters for subsequent packet transmissions. The channel quality measurements are made during the reception, demodulation, and decoding of the message packet.

The channel quality statistics include the bit-error rate (BER) estimate, the number of multipath signals present during demodulation, the post-detection signal quality (PDSQ), and the analog gain control (AGC) output. The BER estimate is based on the ratio of bit errors to packet length. The bit error count is obtained by encoding the decoder output symbols and comparing this sequence to the sequence of hard decisions made on the input symbols of the decoder. The error count is the number of symbol positions in which these two sequences differ. The BER is used in estimating the severity of interference or path loss affecting the communication link between the source node and the destination node. The number of multipath signals is estimated by the counting the number of taps employed by the RAKE processor within the DSSS modem. The number of multipath signals is used in estimating the link margin and the severity of the multipath. The PDSQ is obtained from the outputs of the correlator during demodulation and is used in estimating the link margin and the severity of the multipath or other interference. The AGC system is used in estimating the total power of the received signal and the resulting link margin.

In this example, each node in the network maintains one table, an ATP-table, for each neighbor. In the ATP-table, the node stores the information rate and power information to be used for transmission of message packets to the corresponding neighbor. The ATP-table in this example contains 4 arrays which store the PDSQ, BER, AGC, and number of multipath signals tracked for the last N completed transmission attempts to the corresponding neighbor. A completed transmission attempt is a transmission attempt for which an acknowledgement (ACK) or negative acknowledgement (NACK) has been received by the source node. The ATP-table also maintains the message success status for the last N completed transmission attempts and the time at which the channel quality information is stored.

Figure 5A:
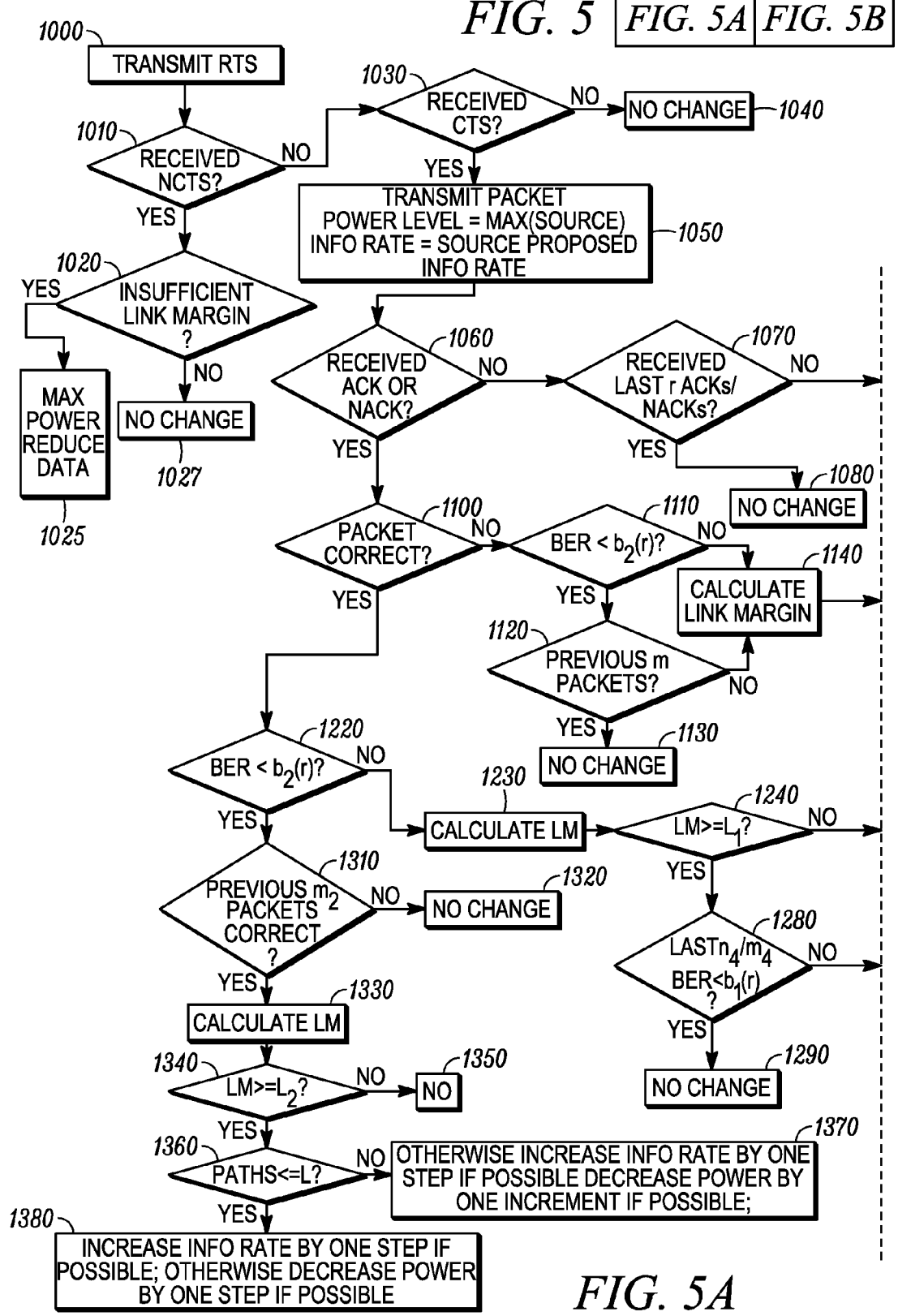
FIG. 5 is a flowchart illustrating an example of operations performed in relation to the Adaptive Transmission Protocol (ATP) of the protocol stack shown in FIG. 4.
Figure 5B:
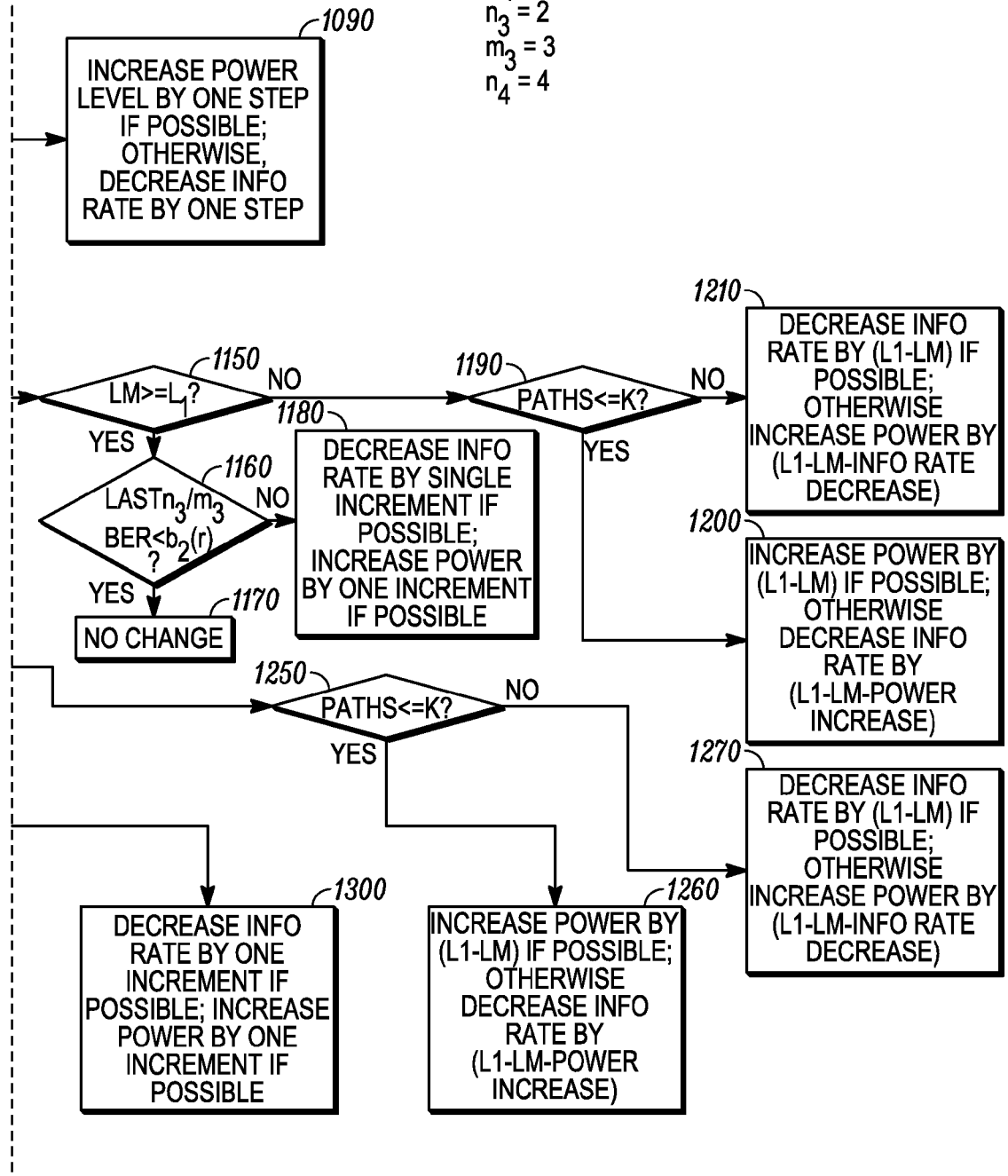

An example of the details of the ATP are illustrated in the flowchart of FIG. 5.

If the source node has a packet to send, in step 1000, it first sends to the destination node an RTS packet containing the information rate and power information from it's ATP-table for the destination node. The proposed values are based on channel quality measurements included in the ACKs and NACKs resulting from N previous completed transmission attempts. If more than T seconds have elapsed since the last ACK or NACK was received, the available channel quality measurements from the previous transmission attempts are considered out-of-date and are discarded. If no channel quality information is available, the node proposes a set of default parameters, e.g. maximum power and low information rate. Also, a different set of default parameters can be chosen so as not to cause an immediate congestion problem.

The ATP 32 allows the destination node to make a correction to the transmitter power level if there has been a significant change in the path loss or the interference conditions since the last packet transmission occurred. If the destination node accepts the RTS packet, it employs the RTS channel quality measurements, the RTS transmission power level, and the source's requested information rate to propose a power level to be used in the transmission of the packet on the communication channel between the two nodes. In determining it's proposed power level, the destination also accounts for possible differences in fading and interference between the reservation channel and the communication channel. If the destination node's calculations indicate that, for the proposed information rate and maximum transmit power, the message packet will not be successfully received, then a negative CTS (NCTS) packet is sent to the source node in step 1010. In the event that a NCTS is received by the source node, the source node updates it's ATP-table for the corresponding neighbor and determines in step 1020 whether there is an insufficient link margin. If there is an insufficient link margin, the transmitter power level is set to max power in step 1025, and the information rate is decremented by one level if possible. That is, it is not possible to decrement the information rate if the setting is already at the minimum information rate. On the other hand, if there is not an insufficient link margin, then in step 1027 no change occurs in the transmitter power level and the information rate.

However, in the event that the destination node's calculations indicate that it is okay to send the packet, the destination node sends to the source node a CTS packet containing it's suggested power level. The source node confirms whether the CTS packet was received in step 1030. If not, the process proceeds to step 1040, and no change occurs in the transmitter power level or information rate. Specifically, the ATP algorithm makes note of the lack of response to an RTS. Initially, it assumes that the missed CTS is due to the destination node being on a data channel as opposed to the destination node moving out of range. After multiple missed CTS's, the ATP algorithm will declare the destination node as lost which will cause the routing algorithms to determine an alternate path to the final destination. Upon receiving the CTS in step 1030, the source node compares the destination suggested power level to its proposed power level stored in the ATP-table for the corresponding neighbor. Although it is possible that the destination node propose a lower power level than the source node, the ATP in this example will only allow the destination node to increase the transmitter power level. The decision to decrease the power level will be based only on the more reliable statistics measured on the communication channel. Thus, at step 1050, the message packet is transmitted at the higher of the source-suggested power and the destination-suggested power. Also at step 1050, the information rate will be that which is proposed by the source node. The destination node is not permitted to request a lower data rate as this may violate the expectations of the QoS algorithms. Likewise, the destination node is not permitted to request a higher data rate as the source node may have determined that the higher rate does not meet the reliability requirements.

Upon receiving the message packet, the destination node measures the PDSQ, BER, AGC, and number of multipath signals present during demodulation. If the packet decodes successfully, the destination node sends the channel quality information to the source in an ACK packet. If the packet does not decode successfully, the destination node sends the channel quality information to the source node in a NACK packet.

After successful decoding of an ACK or NACK packet, the source node learns the values of the channel quality information. This channel quality information and the time at which it is received is stored in the ATP-table. If an ACK is received, the message is considered successful; otherwise the message is considered unsuccessful. The success status is also recorded in the ATP-table. Each channel quality measure, combined with the available channel quality history, is compared against a set of thresholds. Based on these thresholds and on the previous transmission parameters, the source node proposes a power level and information rate for the next transmission to the neighbor of interest. The proposed transmission parameters are stored in the ATP-table for use in transmitting the next packet addressed to that destination node.

That is, as shown in FIG. 5, if the source node determines in step 1060 that no ACK or NACK has been received, the operations proceed to step 1070 where the source node determines if the previous ACKs or NACKs have been received. If so, no change occurs as indicated in step 1080. However, if the previous ACKs or NACKs have not been received, the process proceeds to step 1090 where the power level of the transmitter in the source node is increased by one step if possible. If this is not possible, the information rate is decreased by one step.

If, however, the source node determines in step 1060 that an ACK or NACK has been received, the process proceeds to step 1100 where the source node determines if the packet is correct. If the packet is not correct, the process proceeds to step 1110 where the source node determines whether the bit error rate (BER) is less than a certain value $b_2(r)$. That is, as will now be explained, the process generally operates on the principle that if the BER of the presently received message is slightly bad and the BERs of previous "m" number of messages were fine, then no change is made to the transmission power or information rate. The value "m" can be, for example, 3 or any other suitable number, meaning that the process will not change the transmission power or information rate if only two of the previous messages had BERs which were marginally unacceptable. However, once 3 received messages in a row have BERs which are marginally unacceptable, the algorithm either lowers the information rate at which the next transmission occurs, or increases the power at which the next transmission occurs.

Accordingly, if the BER of the message is less than the value $b_2(r)$, the process proceeds to step 1120 where it is determined whether the previous "m" packets have been received correctly. If so, no change in transmission power or information rate occurs as indicated in step 1130. However, if those packets have not been received correctly, the process proceeds to step 1140 where the source node calculates the link margin. Likewise, if the BER is determined to be equal to or greater than the value $b_2(r)$ in step 1110, the process proceeds directly to step 1140 where the link margin is calculated.

In step 1150, the link margin (LM) is compared to the increasing energy link margin $L_1$. If LM is greater than or equal to $L_1$, the process proceeds to step 1160 where it is determined whether the last $n_3$ divided by $m_3$ BERs are less than the value $b_2(r)$. In these two steps, the algorithm is determining whether this is a temporary or longer lasting condition. If the link margin was acceptable (>L1), this transmission failed due to a burst interference of some type which is unlikely to recur and is not indicative of current conditions. However, if this condition occurred a significant number of times (n3) within the last m3 transmissions, it is a condition which the algorithm will attempt to overcome by increasing signal energy, either by transmitting at a lower information rate or at a higher power. Accordingly, if it is determined in step 1160 that the last n3 out of m3 messages were successfully received, that is, had a BER less than the value $b_2(r)$, there is no change as indicated in step 1170. If not, the source node in step 1180 decreases the information rate by a single increment, if possible, and increases the transmission power by one increment if possible.

However, if in step 1150, LM is determined to be less than $L_1$, the process proceeds to step 1190 where the source node determines whether the number of transmission paths combined within the RAKE (DSSS) receiver is less than or equal to a value K. If so, the source node believes that the signal problem is NOT multipath related and in step 1200 increases the transmission power by ($L_1$–LM) if possible, or decreases the information rate by ($L_1$–LM–power increase). Specifically, the algorithm attempts to add enough signal energy to overcome the deficit in link margin, which can be done by increasing transmission power and decreasing the information rate. In this case, the algorithm attempts to overcome the deficit with transmission power first, and information rate second. However, the algorithm can instead decrease data rate first, and then increase transmission power second. Accordingly, if the number of transmission paths combined within the RAKE (DSSS) receiver is not less than or equal to a value K, the source node believes that a multipath condition exists and in step 1210, decreases the information rate by ($L_1$–LM) if possible, or increases the transmission power by ($L_1$–LM–information rate decrease).

It should also be noted that multipath conditions are more receptive to increases in signal energy brought about by changes in the information rate rather than increases in power. An increase in power simply increases the level of multipath interference relative to the increase in the signal paths which are being used by the rake modem. Power increases do not change the ratios between good signal and destructive multipath. On the other hand, a decrease in the information rate frequently converts the multipath interference into energy which can be combined into the good signal monitored by the RAKE receiver in the DSSS modem.

As indicated in the flowchart and as explained above, steps 1110 through 1210 can occur if the source node determines in step 1100 that the packet is not correct. However, if the packet is correct, the process proceeds to step 1220 where the source node determines whether the BER is less than the value $b_1(r)$. If not, the source node calculates the link margin LM in step 1230. As will now be explained, in this case, although the packet was received correctly, the link margin is indicating that a problem with reception is likely to occur shortly. This sequence of steps attempts to proactively adjust the signal energy prior to detection of a problem by the failed message method described above.

The source node then determines in step 1240 if the LM is greater than or equal to $L_1$. If not, the source node determines whether the number of transmission paths is less than the value K in step 1250. If so, the source node in step 1260 increases the transmission power by ($L_1$–LM) if possible, or decreases the information rate by ($L_1$–LM–power increase). If not, the source node in step 1270 decreases the information rate by ($L_1$–LM) if possible, or increases the transmission power by ($L_1$–LM–information rate decrease). These operations are similar to the corresponding operations discussed above.

However, if the source node determines in step 1240 that the LM is greater than $L_1$, the source node determines in step 1280 whether the last $n_4$ divided by $m_4$ BERs are less than the value $b_1(r)$. If so, there is no change as indicated in step 1290. If not, the source node in step 1300 decreases the information rate by a single increment, if possible, and increases the transmission power by one increment if possible. In this latter case, the source node has determined that, although the link margin is sufficient, the bit error rate continues to be marginal and is likely to result in a failed transmission attempt within the next few packets. A proactive step to increase signal energy is likely to be needed to maintain a reliable link.

Concerning step 1220 again, if the source node determines that the BER is less than or equal to the value $b_1(r)$, the process proceeds to step 1310 where the source node determines if the previous $m_2$ packets are correct. If not, there is no change as indicated in step 1320. However, if the packets are correct, the source node calculates LM in step 1330 and determines if LM is greater than or equal to a value $L_2$ in step 1340. If not, there is no change as indicated in step 1350. However, if so, then the source node determines whether the number of transmission paths is less than or equal to 1 in step 1360. If the number of paths is less than or equal to 1, the source node in step 1370 increases the information rate by one step if possible or decreases the transmission power by one step if possible. However, if the number of paths is greater than 1, in step 1380, the source node increases the information rate by one step if possible, or decreases the power by one increment if possible. In this sequence of steps, the ATP algorithm is verifying that the link is reliable and has been reliable for several previous transmissions before reducing the transmitted signal energy. Reducing the transmitted signal energy has the benefits of either transmitting the datagram faster (reduced delay, increased network throughput) or using less power (longer battery life and increased geographic reuse of frequency).

As further shown in FIG. 4, the layer of the protocol stack 200 that includes the ATP 32 also includes the Neighbor Discovery (NBR) algorithm 34. The NBR 34 serves two purposes: rapid discovery of infrastructure and neighborhood size maintenance. The NBR algorithm 34 uses a solicitation message to discover pieces of infrastructure that are used to initialize the device and connect it to the rest of the world, such as the Internet, PSTN, other cellular networks, and so on. The NBR algorithm 34 also sends out beacons at a slow rate to probe the neighborhood. By maintaining a reasonable size neighborhood, maximal geographic reuse can be obtained. The NBR algorithm 34 attempts to maintain a neighborhood consisting of less than twenty nodes such that no one at the fringes is denied service. Nodes at distance are expected to use the store and forward techniques of ad-hoc routing whenever possible to avoid high power transmissions which block large geographic areas.

Furthermore, the NBR algorithm relies on passive listening for much of its information. The media access control algorithm forwards all received RTS/CTS exchanges along with the received signal strength indicator to the NBR algorithm 34. The NBR algorithm 34 uses the received power to maintain knowledge about the neighborhood in terms of neighbor identities, received power, data rates to destinations, and limited connectivity information. The connectivity information includes both the source address (node which made the transmission) as well as the destination address. Destination addresses that are also neighbors make up the immediate neighborhood. Destination addresses that are not currently neighbors are elements of the neighbors neighbor list. The neighbor's neighbor list is used to gauge the connectivity of this nodes neighborhood. A strongly connected network has a large list of neighbors and a smaller list of nodes at two hops. On the contrary, a weakly connected network has a small list of neighbors relative to the list of nodes at two hops. This information may be used for modification of the transmission policy by the media access control algorithm. Strongly connected networks exhibit less of the near/far CSMA problem than weakly connected networks. The media access transmission policy can be more aggressive in its use of channel resources than the weakly connected network.

Additionally, the neighbor discovery advertisement has been extended to include the node's position and an indication of it's suitability to act as a position reference. Wireless routers (WR) 107 and Intelligent Access Points (IAP) 106 (see FIG. 2) are generally preferred as position reference as they are typically installed in a fixed location and given an accurate position.

As further indicated, the Link Apps layer includes a location (LOC) application. The location application issues requests for range measurements to the media access control algorithm. The location application maintains a list of nodes, typically WR's and IAP's, which have a known location. The location application selects a minimum of four nodes and requests range measurements. As the measurements complete, they are forwarded from the MAC to the LOC. Once the LOC obtains the expected measurements, the position determination algorithm calculates the position of the mobile node. This calculation is available to the host computer for use in any location related applications such as tracking, locality of services (nearest Italian restaurant with three stars), or location dependent advertising. An example of the operations performed by the LOC application are set forth in U.S. patent application Ser. No. 09/973,799 of Eric A. Whitehill, filed on Oct. 11, 2001 and entitled "System and Method for Efficiently Performing Two-Way Ranging to Determine the Location of a Wireless Node in a Communication Network", in U.S. patent application Ser. No. 09/996,603 of John M. Belcea, filed on Nov. 30, 2001 and entitled "A System and Method for Computing the Signal Propagation Time and the Clock Correction for Mobile Stations in a Wireless Network", and in U.S. patent application Ser. No. 09/988,001 of John M. Belcea, filed on Nov. 16, 2001 and entitled "A System and Method for Computing the Location of a Mobile Terminal in a Wireless Communications Network", the entire contents of each of these applications being incorporated herein by reference.

The next layer in the protocol stack 200 is the Traffic Control (TC) layer 36. The TC 36 process operates similarly to the LLC 30 in terms of queuing algorithms according to Quality of Service requests and relevancy. All discussions in the LLC 30 relative to these two subjects are equally applicable to TC 36 and thus will not be repeated here. The TC 36 algorithm holds the majority of transmission packets until they are ready to be serviced by the LLC 30. The TC 36 holds onto the packet so that the routing decision is made at the last time interval without affecting the high-speed interaction between the LLC 30 and the MAC.

The next layer in the protocol stack 200 is the Ad Hoc Routing (AHR) layer 38. As can be appreciated by one skilled in the art, the AHR 38 strategy is a least cost type routing algorithm where the cost is a algebraic expression containing the routing metrics: energy, hops, congestion, and battery life. These metrics are used to determine which route is optimal given the QoS requirements of the given traffic type. Embedding of the AHR algorithm 38 beneath the IP layer 16 as in the embodiment of the present invention shown in FIG. 4 preserves the real time nature of the traffic that is transiting the network. This is contrary to the execution of the routing algorithms above the IP layer 16, as in the conventional stack shown in FIG. 1, which requires every packet to transit the IP layer 16 with its associated queuing and processing delays. These hindrances in performance are created by the use of a general protocol that is not tailored to the real time requirements of traffic such as voice. Embedding only the required functionality beneath the IP layer 16 and tailoring the interrupt structure of the real time operating system results in superior performance.

As can be further appreciated by one skilled in the art, the AHR algorithm 38 is a modified distance vector algorithm. The modifications to the distance vector algorithm include maintaining one primary and two backup routes; cost metric which is a function of energy, hops, congestion, and battery; on-demand elements to inform active traffic streams of link failures or local repairs; pre-emptive handover support to the LIP association algorithm; and selective pruning to reduce size in bytes of routing advertisement. In this example, this algorithm maintains three current routes to each destination. Routes are maintained by the Adaptive Transmission Protocol for next hop data rates/power. Routing Updates are used for destinations not reachable with one transmission in addition to exchange of the battery and power metrics.

It is also noted that the pruning algorithm can add nodes to the routing algorithm according to the following rules:
  1. IAP's
  2. Neighbor nodes (especially wireless routers)
  3. Neighbor's neighbors
  4. Other terminal nodes—typically, this would include nodes which are actively sources or sinks of traffic
  5. Wireless routers which are not neighbors—WR's which are not neighbors are included on a space available basis. WR's are not destinations of traffic from within the Ad-Hoc network. Rather, they are only destinations of Network Management type traffic from an IAP which maintains the route. Wireless routers are implicitly included by examining the cost metrics to other destinations advertised by nodes in category 2 whose routes likely include a wireless router.

Figure 6:
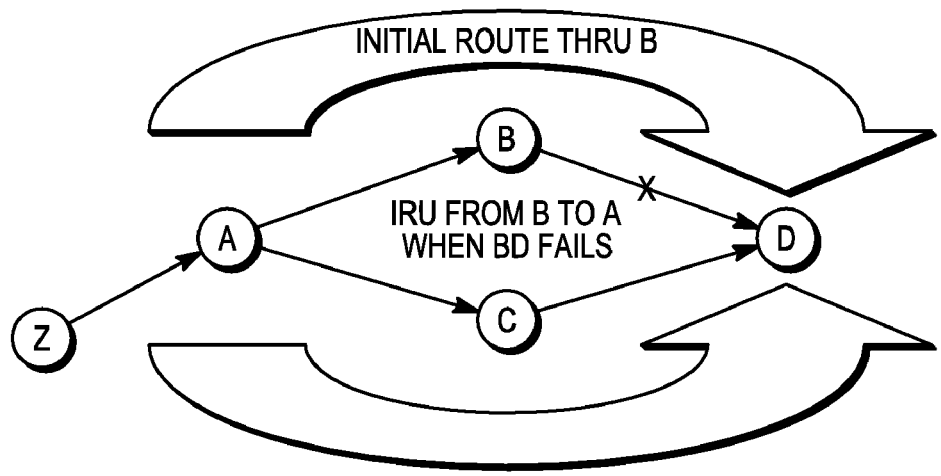
FIG. 6 is a conceptual diagram illustrating en example of the manner in which the ad-hoc routing capabilities of the network shown in FIG. 2 adaptively change routing paths.
Figure 7:
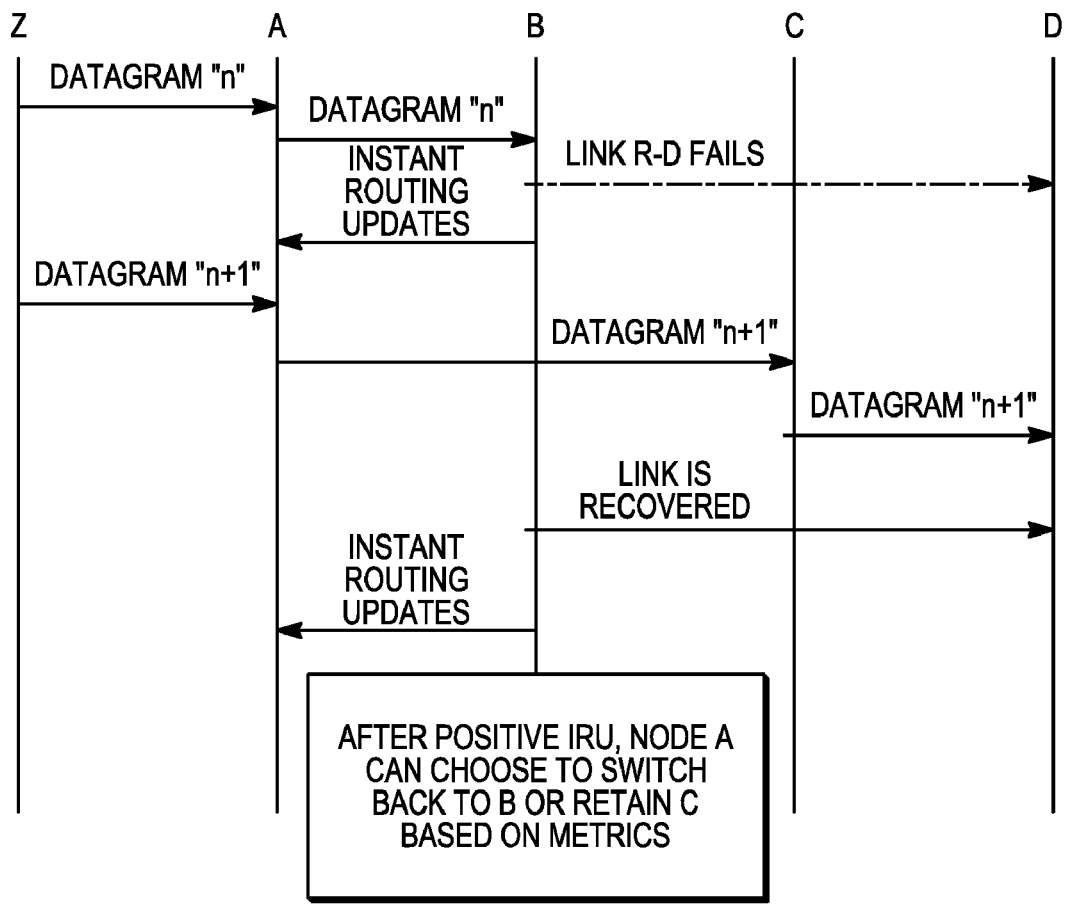
FIG. 7 is a timing diagram illustrating an example of the messages sent between the nodes shown in FIG. 6.

Furthermore, the On-Demand elements are used to inform active traffic streams of link failures or local repairs. These elements are accomplished with a unicast message entitled "Instant Routing Update (IRU). As these messages are sent unicast with high priority, they can quickly and reliably inform nodes that a link has broken. As the IRU's are forwarded toward the original source, relaying nodes can make alternate choices of forwarding node to repair the traffic flow, as shown in FIGS. 6 and 7.

That is, if node Z is sending packets to node D along the path A-B-D and the link between nodes B and D fails, node A can adaptively begin sending the packets along the path A-C-D. As shown in FIG. 7, node Z sends a datagram "n" to node A, which sends the datagram "n" to node B. When the link between nodes B and D fails, node B provides an instant routing update to node A indicating the failure. When node Z sends the next datagram "n+1" to node A, node A will send that datagram to node C, which will then send the datagram to node D. When the link between nodes B and D ultimately recovers, node B sends and instant routing update to node A indicating that the route is again available. Based on the conditions of the route along path A-B-D versus path A-C-D, node A can choose to remain sending packets along path A-C-D, or switch back to path A-B-D.

The Ad-Hoc routing algorithm also depends on the passive listening feature of the neighbor discovery algorithm. As described above, the NBR algorithm 34 continuously extracts from all received RTS/CTS messages the power and data rates of connections between neighbors and other nodes which may or may not be this neighbor's nodes. The NBR algorithm 34 has the ability to invalidate nodes which have not been heard from in too long a time. These invalidations are presented to the routing algorithm so that nodes which are no longer available are removed from the forwarding table within the routing algorithm.

The next layer in the protocol stack 200 is the Flow Processing (FP) layer 40. The FP algorithm 40 performs functions similar to the RSVP 20*b* protocol within the IP stack 10 shown in FIG. 1. The FP 40 solution has the same advantages in terms of embedding the solution for greater speed and reliability for delivery of real time traffic. FP 40 works by negotiating a source routed path from source to destination where the intermediate relayers agree to allocate some portion of their bandwidth for the FP 40 request that has been requested. In this way, relayers as well as the destination have effectively signed contracts agreeing to deliver the messages within the requirements of the traffic type (i.e. delay, throughput, and reliability). This is accomplished by permitting intermediate nodes to prioritize the contracted traffic such that this traffic is served before best effort traffic. Additionally, the intermediate relayers have the ability to reject lower priority datagrams when they are expecting to receive traffic that has been contracted.

The next layer in the protocol stack 200 is the Intelligent Access (IA) module 42. The IA module 42 is the embedded module that creates an association between a subscriber device and an Intelligent Access Point (IAP). The IAP provides the interface between the wireless and the wired assets. The IAP permits the wireless user to access all types of services such as the internet, public telephone network, and cellular network. The embedding of the IA 42 module permits the user to quickly associate, authorize, and authenticate itself within the network. Once these processes are complete, the user has full access to all of the services provided. Typical cellular devices require upwards of ten seconds to accomplish these functions, where a similar set of actions using this embodiment of the present invention may be accomplished within two seconds. The IA 42 algorithm also supports the handoff of subscriber devices between different IAPs. As users migrate within a metropolitan size area, the IA 42 algorithm determines when it is appropriate to create a new association rather than rely on the multi-hop characteristics of the ad-hoc protocol. In general, shorter paths to the IAPs are preferable.

The next layer in the stack 200 is the Admission Control (AC) layer 44. The AC 44 process serves several functions. In general, ad-hoc networks attempt to avoid global broadcasts. These broadcasts are typically associated with internet protocols such as DHCP. DHCP issues a broadcast to locate a DHCP server from which an IP address is obtained. Although a broadcast could be performed in an ad-hoc network via a flooding approach, these techniques are very painful in terms of bandwidth required to reach all nodes within the network. The AC 44 module traps the DHCP broadcasts and tunnels requests to an IAP that performs a broadcast on the wired media where the DHCP server resides. In this way, the DHCP request is turned into a unicast transfer between known entities. Unicast transfers are much more reliable and efficient than the broadcast mechanism.

Another element of the AC 44 protocol is the throttling of data into the network. The AC 44 module determines the quality of service required and responds appropriately based on the current network conditions as determined by the routing protocol. For example, voice messages may be entered into the protocol stack without delay while datagrams may be held for a short time. Delaying datagrams effectively causes the TCP protocol to throttle back its estimate of the network congestion and the TCP protocol will enter traffic into the network at a slower pace. This throttling action allows the underlying network to reliably deliver the data without compromising the ability of the network to deliver the quality of service required by real time applications.

As mentioned above Speed of Service; Reliability of service; Self-Healing in case of catastrophic failure of an infrastructure component; Load-Balancing and Geographic Reuse are all increased by the protocol stack 200 according the embodiment of the present invention described above. Speed of service is provided by the distributed pooling of information regarding the network operation at all nodes within the network. Through the exchange of ad-hoc routing updates as well as flow processing bandwidth guarantees, nodes are advised of the route which best meets their quality of service requirements. In the case of voice, speed of service is critical. Through the use of redundant paths, voice messages are forwarded to their destination along the paths that exhibit the shortest delay with sufficient reliability. The combination of optimal paths with bandwidth reservations according to this embodiment insures that voice traffic is delivered within the 150 ms recommendation by the International Telecommunications Union (ITU).

Furthermore, the reliability of service through reliable delivery of IP datagrams over ad-hoc wireless networks is improved with the use of embedded techniques described above, which combines point-to-point and end-to-end features whose sum provides the required reliability. Typical wireless networks, such as 802.11 networks, may use link layer protocols to perform retransmissions if the transmission is found to be in error. In the case of 802.11, the use of an acknowledgment of successful transmission is an option. In the strategy according to the described embodiment of the present invention, the link layer retransmission strategy with full acknowledgment is coupled with the self-leveling and bandwidth guarantees provided by the ad-hoc routing protocols.

Full acknowledgment permits a rapid retransmission, which benefits both speed of service and reliability. In the case of the retransmission attempts, the adaptive transmission protocol benefits from the signal quality information returned by this acknowledgment, and can take appropriate actions such as increasing power and lowering data rate to improve the signal to noise ratio and insure a reliable transmission. One typical cause of reliability loss in other networks in the overload of traffic over particular routers. Once other routers get overloaded, they discard packets as their queues have over-filled. The ad-hoc routing technology according to the embodiment of the present invention described above avoids this problem through the self-leveling property. Within the routing algorithm, a congestion metric is distributed which informs upstream nodes of congested conditions and permits them to choose alternate routes which avoid overloaded nodes. Also, the bandwidth guarantees provided within the embedded software force the traffic which can cause an overload away from nodes which have signed contracts to provide high quality service such as voice.

As can be further appreciated by one skilled in the art, Ad-Hoc networks have a natural property that provides an advantage over traditional cellular and 802.11 implementations. In cellular networks, a base station or pico-cell is used to gather all traffic within a geographic area and forward it to the correct endpoint. In case of a catastrophic failure of an infrastructure component (lightning, power outage,) subscribers are unable to complete their calls within the coverage area of the stricken cell. In ad-hoc networks, the outage is identified by the subscribers and their calls are immediately re-routed to other wireless to wired transitions points (Intelligent Access Points in present invention). In ad-hoc networks, it is unlikely that a call will be dropped and service will be maintained to all subscribers wishing to make calls after the catastrophic failure has occurred. In cellular networks, the calls are dropped and service is impossible until the failure has been remedied through equipment replacement or a redundant unit is brought on-line. The cellular solution is both expensive and provides inferior service to the customer.

Furthermore, in cellular networks, it is relatively easy to demonstrate a situation where service is not obtainable due to an overload of customers attempting to make calls. Typical examples of this are the arrival of an airplane or flight cancellations in an airport, halftime at a football game, and a conference during a break period. Cellular phones contact the nearest cellular station and once it's capacity is full, additional calls are denied. In ad-hoc networks, the routing algorithms balance the peak demand by routing some calls to LAP's that are further away from the user. In the football example, calls may be directed to the IAP's in adjacent buildings by wireless routers on the roof of the stadium. The multiple hops required to redirect the call to IAP's at greater distances are accomplished well within the delay budget required for acceptable delay. The property of load balancing permits a much greater number of users concentrated in dense area to complete their transactions. Load balancing is accomplished on an end-to-end basis by the routing metrics and the bandwidth reservations portion of the present invention ad-hoc routing strategy.

Also, cellular networks provide coverage over a specified geographic interval. All calls are routed between the user and the base station or pico-cell. Thus, the central point (base station/pico cell) becomes the bottleneck that limits the call volume. In the present invention solution, all nodes (subscriber devices, wireless routers, and IAP's) are a part of the network and may be used to relay/route calls. Ad-hoc technologies get greater geographic reuse due to the aggressive use of power control to permit frequency reuse that is dependent on the density of users. As the geographic area becomes more dense, the algorithms reduce the transmit power which blocks a small geographic area. By creating smaller blocked areas, multiple transmissions may be accomplished in parallel. This provides an increase in the volume of calls that can be accomplished. Cellular companies are limited to a fixed power setting surrounding their pico-cell. All transmissions by the pico-cell/base station necessarily block the entire geographic area. By transmitting the minimum required transmit power, the techniques provided by the embodiment of the present invention described above permits multiple simultaneous transmission to be accomplished.

Other variations of the embodiment described above may also be employed in the network 100. For example, the routing protocols discussed above currently are based on a distance vector approach. Alternatively, Link-State and On-demand approaches are equally admissible within this protocol architecture with similar benefits.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. An ad-hoc wireless communications network employing a protocol stack, the protocol stack comprising:
   an Internet Protocol Routing Layer; and
   one or more protocol algorithms embedded between the Internet Protocol Routing Layer and a media access control layer, for routing of data packets between a plurality of nodes in the ad-hoc wireless communications network, the one or more protocol algorithms comprising:
   an Ad-Hoc Routing algorithm, wherein the Ad-Hoc Routing algorithm is a least cost type routing algorithm for determining an optimal route based on a quality of service requirements of a traffic type in a real time traffic transiting the ad-hoc wireless communications network, where the cost is an algebraic expression comprising one or more routing metrics, and
   a Flow Processing algorithm, wherein the Flow Processing algorithm negotiates a source routed path from a source node to a destination node in the real time traffic, wherein one or more intermediate relay nodes agree to allocate at least a portion of their bandwidth for a Flow Processing request from the Flow Processing algorithm.

2. The ad-hoc wireless communications network employing a protocol stack of claim 1, wherein the one or more routing metrics are selected from a group comprising an energy, a number of hops, a congestion, and a battery life.

3. The ad-hoc wireless communications network employing a protocol stack of claim 1, wherein the Flow Processing algorithm negotiates to provide an agreement by one or more relay nodes and the destination node to communicate one or more messages within the quality of service requirements of the traffic type.

4. The ad-hoc wireless communications network employing a protocol stack of claim 1, wherein the one or more protocol algorithms of the protocol stack further comprise:
   an Adaptive Transmission Protocol algorithm, wherein the Adaptive Transmission Protocol algorithm adjusts an information rate and a transmitter power level to provide for a successful transmission of data packets.

5. The ad-hoc wireless communications network employing a protocol stack of claim 4, wherein the Adaptive Transmission Protocol algorithm utilizes one or more channel quality measurements made in a destination node's receiver to optimize the information rate and the transmitter power level for one or more subsequent packet transmissions to the destination node.

6. The ad-hoc wireless communications network employing a protocol stack of claim 5, wherein the channel quality measurements comprise one or more of a bit-error rate estimate, a number of multipath signals present during demodulation, a post-detection signal quality, and an analog gain control output.

7. The ad-hoc wireless communications network employing a protocol stack of claim 4, wherein the one or more protocol algorithms of the protocol stack further comprise:
 a Neighbor Discovery algorithm, wherein the Neighbor Discovery algorithm provides for a discovery of one or more infrastructure elements, and further provides for a neighborhood size maintenance,
 an Intelligent Access module, wherein the Intelligent Access module creates an association between a node and one or more Intelligent Access Points within the ad-hoc wireless communications network,
 a Logical Link Control layer, wherein the Logical Link Control layer comprises one or more of a link layer queuing algorithm, a random backoff algorithm, a relevancy timer, and a retransmission policy,
 a Traffic Control algorithm, wherein the Traffic Control algorithm stores a data packet until a routing decision provides for the data packet to be serviced by the Logical Link Control layer, and
 an Admission Control module, wherein the Admission Control module:
  traps a broadcast and tunnels requests to an Intelligent Access Point, and
  determines a quality of service required and responds appropriately based on one or more current network conditions as determined by the Ad-Hoc routing protocol.

8. The ad-hoc wireless communications network employing a protocol stack of claim 7, wherein the link layer queuing algorithm comprises a prioritized First-In-First-Out algorithm, wherein a priority scheme for the link layer queuing algorithm is dependent on a Quality-of-Service(QoS) requested and a number of previous transmission attempts.

9. The ad-hoc wireless communications network employing a protocol stack of claim 7, wherein the random backoff algorithm is dependent on a quality of service requested.

10. The ad-hoc wireless communications network employing a protocol stack of claim 1, wherein the one or more protocol algorithms of the protocol stack further comprise:
 a Neighbor Discovery algorithm, wherein the Neighbor Discovery algorithm provides for a discovery of one or more infrastructure elements, and further provides for a neighborhood size maintenance, and
 an Intelligent Access module, wherein the Intelligent Access module creates an association between a node and one or more Intelligent Access Points within the ad-hoc wireless communications network.

11. The ad-hoc wireless communications network employing a protocol stack of claim 10, wherein the Neighbor Discovery algorithm uses a solicitation message for a discovery of one or more infrastructure elements.

12. The ad-hoc wireless communications network employing a protocol stack of claim 10, wherein the Neighbor Discovery algorithm sends out beacons at a slow rate to probe the neighborhood.

13. The ad-hoc wireless communications network employing a protocol stack of claim 10, wherein the Neighbor Discovery algorithm on passive listening for receiving information.

14. The ad-hoc wireless communications network employing a protocol stack of claim 10, wherein the Neighbor Discovery algorithm maintains node information including one or more of a neighbor identity, a received power, a data rate to a destination, a connectivity information, a node's position, and a suitability to act as a position reference.

* * * * *

UNITED STATES PATENT AND TRADEMARK OFFICE
CERTIFICATE OF CORRECTION

| | |
|---|---|
| PATENT NO. | : 7,756,041 B2 |
| APPLICATION NO. | : 10/157979 |
| DATED | : July 13, 2010 |
| INVENTOR(S) | : Whitehill et al. |

It is certified that error appears in the above-identified patent and that said Letters Patent is hereby corrected as shown below:

1. In Column 12, Line 42, delete "LIP" and insert -- IAP --, therefor.

2. In Column 13, Line 17, delete "sends and instant" and insert -- sends an instant --, therefor.

3. In Column 15, Line 46, delete "LAP's" and insert -- IAP's --, therefor.

Signed and Sealed this
Nineteenth Day of June, 2012

David J. Kappos
*Director of the United States Patent and Trademark Office*